US010556785B2

(12) United States Patent
Göpner et al.

(10) Patent No.: US 10,556,785 B2
(45) Date of Patent: Feb. 11, 2020

(54) INDUSTRIAL TRUCK AND METHOD FOR CONTROLLING AN INDUSTRIAL TRUCK

(71) Applicant: Jungheinrich Aktiengesellschaft, Hamburg (DE)

(72) Inventors: Oliver Göpner, Oering (DE); Michael Schüler, Schönberg (DE)

(73) Assignee: Jungheinrich Aktiengesellschaft, Hamburg (DE)

(*) Notice: Subject to any disclaimer, the term of this patent is extended or adjusted under 35 U.S.C. 154(b) by 205 days.

(21) Appl. No.: 15/683,856

(22) Filed: Aug. 23, 2017

(65) Prior Publication Data
US 2018/0057331 A1 Mar. 1, 2018

(30) Foreign Application Priority Data
Aug. 24, 2016 (DE) .................. 10 2016 115 703

(51) Int. Cl.
G01C 22/00 (2006.01)
B66F 17/00 (2006.01)
(Continued)

(52) U.S. Cl.
CPC ............ B66F 17/003 (2013.01); B66F 9/063 (2013.01); B66F 9/07509 (2013.01);
(Continued)

(58) Field of Classification Search
CPC .. B66F 17/003; B66F 9/07581; B66F 9/0755; B66F 9/063; B66F 9/07572;
(Continued)

(56) References Cited

U.S. PATENT DOCUMENTS 8,072,309 B2 12/2011 Kraimer et al.
8,193,903 B2 6/2012 Kraimer et al.
(Continued)

FOREIGN PATENT DOCUMENTS

DE 102012016783 A1 3/2013
DE 102012018427 A1 5/2014
(Continued)

OTHER PUBLICATIONS

EP 17187252.6; Aug. 22, 2017; European Search Report dated Jan. 31, 2018; 9 pages.

Primary Examiner — Shardul D Patel
(74) Attorney, Agent, or Firm — Barclay Damon LLP

(57) ABSTRACT

A system for controlling an industrial truck with a drive portion including a traction drive portion, a steering portion, and a load portion, comprises a portable transmitting unit configured to be positioned away from the industrial truck. The system further comprises at least three transmitting and receiving units positioned in a predetermined spatial arrangement with respect to one another on the drive portion. An evaluation unit is provided that is configured to determine a position of the portable transmitting and receiving unit relative to the industrial truck by measuring signal propagation times. The industrial truck further comprises a control unit configured to send a control command for traction drive and/or steering if the relative position of the portable transmitting and receiving unit is located within a predetermined spatial region relative to the industrial truck.

26 Claims, 2 Drawing Sheets

(51) Int. Cl.
*B66F 9/06* (2006.01)
*B66F 9/075* (2006.01)
*B66F 9/24* (2006.01)

(52) U.S. Cl.
CPC ...... *B66F 9/07568* (2013.01); *B66F 9/07572* (2013.01); *B66F 9/24* (2013.01)

(58) Field of Classification Search
CPC .... B66F 9/07568; B66F 9/07509; B66F 9/24; G01S 5/14
USPC ...... 701/23, 25, 30, 37, 42, 70; 60/438, 444, 60/487; 180/89.13, 89.15, 400, 422; 348/46; 340/572.1; 705/29; 187/222; 362/485; 414/663
See application file for complete search history.

(56) References Cited

U.S. PATENT DOCUMENTS

| | | | |
|---|---|---|---|
| 8,239,251 B2 | 8/2012 | Wellman | |
| 8,249,910 B2 | 8/2012 | Wellman et al. | |
| 8,452,464 B2 * | 5/2013 | Castaneda | B66F 9/0755 180/19.2 |
| 8,725,317 B2 | 5/2014 | Elston et al. | |
| 8,725,362 B2 | 5/2014 | Elston et al. | |
| 8,725,363 B2 | 5/2014 | Elston et al. | |
| 8,731,777 B2 | 5/2014 | Castaneda et al. | |
| 8,970,363 B2 | 3/2015 | Kraimer et al. | |
| 9,002,581 B2 | 4/2015 | Castaneda et al. | |
| 9,082,293 B2 | 7/2015 | Wellman et al. | |
| 9,122,276 B2 | 9/2015 | Kraimer et al. | |
| 9,152,933 B2 | 10/2015 | Wellman | |
| 9,202,186 B2 | 12/2015 | Wellman et al. | |
| 9,207,673 B2 | 12/2015 | Pulskamp et al. | |
| 9,493,184 B2 | 11/2016 | Castaneda et al. | |
| 9,522,817 B2 | 12/2016 | Castaneda et al. | |
| 9,645,968 B2 | 5/2017 | Elston et al. | |
| 9,908,527 B2 | 3/2018 | Elston et al. | |
| 2008/0051952 A1 * | 2/2008 | Tushaus | B66F 9/24 701/25 |
| 2010/0057593 A1 * | 3/2010 | Moir | G01G 19/083 705/29 |
| 2010/0231926 A1 * | 9/2010 | Manken | G01S 3/784 356/614 |
| 2011/0166721 A1 * | 7/2011 | Castaneda | B62D 15/0265 701/2 |
| 2012/0078471 A1 * | 3/2012 | Siefring | B66F 9/0755 701/41 |
| 2012/0245765 A1 * | 9/2012 | Medwin | B66F 9/0755 701/2 |
| 2014/0232826 A1 * | 8/2014 | Halata | B66F 9/0755 348/46 |
| 2015/0057843 A1 | 2/2015 | Kraimer et al. | |
| 2015/0123771 A1 * | 5/2015 | Otto | G06K 7/0008 340/10.34 |
| 2017/0057798 A1 * | 3/2017 | Dues | B66F 9/07581 |
| 2017/0316253 A1 * | 11/2017 | Phillips | G06T 7/74 |
| 2018/0060764 A1 * | 3/2018 | Hance | B65C 1/0492 |
| 2018/0068255 A1 * | 3/2018 | Hance | B65G 57/03 |
| 2018/0079633 A1 | 3/2018 | Kraimer et al. | |

FOREIGN PATENT DOCUMENTS

| | | |
|---|---|---|
| DE | 102013110456 A1 | 3/2015 |
| EP | 2851331 B1 | 2/2016 |

* cited by examiner

INDUSTRIAL TRUCK AND METHOD FOR CONTROLLING AN INDUSTRIAL TRUCK

CROSS REFERENCE TO RELATED INVENTION

This application is based upon and claims priority to, under relevant sections of 35 U.S.C. § 119, German Patent Application No. 102016115703.1, filed Aug. 24, 2016, the entire contents of which are hereby incorporated by reference.

BACKGROUND

The present invention relates to an industrial truck, in particular a picking vehicle, and a method for controlling an industrial truck.

A method for controlling an industrial truck, in which the industrial truck has an optical sensor that has a monitoring range and is connected to a control device which determines and tracks the position of a person within a predefined monitoring range was disclosed by EP 2851331 B1. Within the monitoring range, monitoring limits are defined in the form of boundary lines that the control device monitors if the position of the person has exceeded the monitoring limit. If it is established that the boundary line has been exceeded, a traction drive of the industrial truck is controlled until the position of the person is again on the original side of the monitoring limit. In this way, it is possible to guarantee a minimum distance of a person from the vehicle.

A method for locating a mobile unit relative to a target device is known from DE 102012018427 A1. A distance measurement based on radio signals is described for the relative locating between a mobile unit and a target device. During this, propagation times of radio signals or also phase positions of the radio signals can be evaluated. The distance measurements are used for so-called trilateration, in which distances of the mobile unit from at least three different reference points (anchors) are determined. The reference points can be separate antennas or transmitting/receiving units on the target device, wherein the arrangement of the reference points with respect to one another must be known and is also incorporated into the evaluation.

The disadvantage of the known method for controlling a picking vehicle is that movements of the operator in the detection range of the optical sensor can lead to unclear situations with the optical system.

BRIEF SUMMARY OF THE INVENTION

The object of the invention is to provide an industrial truck and a method for controlling an industrial truck, which make it possible to work safely with the driving industrial truck without the risk of injuries.

The industrial truck according to the invention is equipped with a drive portion and a load portion. The drive portion has a traction drive and steering. The load portion is suitable for transporting products, particularly for picking products. At least three transmitting and receiving units are mounted in a predetermined spatial arrangement with respect to one another on the drive portion of the industrial truck according to the invention. The three transmitting and receiving units have a defined spatial position relative to one another, which does not change relative to one another even during the operation of the industrial truck. In addition, the industrial truck according to the invention is equipped with an evaluation unit which determines a position of a portable transmitting and receiving unit relative to the industrial truck by means of measuring signal propagation times. The measurement by means of the signal propagation times is, in this case, not only limited to a simple measurement of time, but can, for example, also have recourse to phase differences between incoming and outgoing signals.

In addition, the industrial truck according to the invention has a control unit which sends a control command for the traction drive and/or the steering if the relative position of the mobile transmitting and receiving unit is located within a predetermined spatial region relative to the industrial truck. In this case, it is not absolutely essential for the predetermined spatial region to be a three-dimensional spatial region, but it can also be a two-dimensional plane depending on the result of the evaluation unit. In the case of the approach according to the invention of triggering control commands for the industrial truck, whether this is to drive or steer the industrial truck, by means of predetermined spatial regions, it is possible to interact with the vehicle, for example during the picking of goods, and to control the vehicle by means of a change in position.

In an embodiment, the control unit has two or more predetermined spatial regions with control commands assigned to each. In this way, two different control commands can be executed on the vehicle, wherein the control commands are triggered by the relative position of the mobile transmitting and receiving unit relative to the vehicle.

In an embodiment, the predetermined spatial regions, to which control commands are assigned, are arranged symmetrically to the longitudinal direction of a vehicle. This means that if a spatial region to which a control command has been assigned is provided on the right side of the vehicle, a spatial region to which the same control command is assigned is also provided on the left side. The driver and user of the industrial truck according to the invention does not therefore need to distinguish whether he is located on the left or the right side of the industrial truck.

In an embodiment, the control unit has a first spatial region comprising the load portion, which is assigned a control command for stopping and/or braking the vehicle. The first predetermined spatial region is located in the load portion which is also particularly suitable for picking. If the portable transmitting and receiving unit is located in this spatial region, a control command for stopping and/or braking the vehicle is assigned. The stopping and/or braking can, in this case, comprise both motor braking and the use of a brake. Assigning the control command for stopping and/or braking the vehicle to the first predetermined spatial region ensures that the industrial truck does not change its position if the portable transmitting and receiving unit is located in the area of the load portion. In an embodiment, a relative position in which the braking and/or stopping of the industrial truck occurs can be selected for the control command of the first spatial region. This relative position can, for example, be a position close to one end of the load portion so that an ergonomically favorable working position is achieved.

In another embodiment, a second spatial region is provided on each side of the drive portion respectively and is assigned a control command for driving. If the portable transmitting and receiving unit is located in the second predetermined spatial region, the industrial truck drives at a predetermined speed, for example walking speed. The second spatial region can be used to set up an accompanying mode or follower mode for the industrial truck. If, for example, the industrial truck stops when the portable transmitting and receiving unit leaves the second spatial region, a person carrying the portable transmitting and receiving unit can walk along beside the industrial truck.

In an embodiment, the control unit has a third predetermined spatial region located on the side of the drive portion pointing away from or opposite the load portion. A control command which stops and/or brakes the industrial truck may be assigned to the third predetermined spatial region. In a preferred configuration, the first, second and third spatial regions completely cover the area around the industrial truck and the second spatial region is provided on both sides of the vehicle.

In a further embodiment, at least one fourth transmitting and receiving unit is arranged on the drive portion. The fourth transmitting and receiving unit is configured to additionally determine a height above the ground for the mobile transmitting and receiving unit. Whilst the height of the portable transmitting and receiving unit above the ground in the spatial regions is of no importance, the height can be evaluated as separate information. To this end, the transmitting and receiving units are usually required in a predetermined location with respect to one another.

For example, the height of the portable transmitting and receiving unit can be evaluated by the control unit to the effect that, in response to the identified height of the mobile transmitting and receiving unit, a control command is sent for the load portion/vehicle. The control command can, for example, be a control command for stopping and/or braking the vehicle if the detected height is located below a minimum height. The minimum height can, in this case, be selected such that falling below the minimum height is a clear sign that the portable transmitting and receiving unit is located on the ground or close to the ground. The cause of this can be that the portable transmitting and receiving unit has been dropped or a person carrying this has fallen.

In another embodiment, the control unit is configured to send a control command for lifting or lowering the load portion if the relative position of the portable transmitting and receiving unit is located in the first spatial region. It is already ensured in the first spatial region that the industrial truck does not drive. The load portion can be raised and lowered during the activity, for example during picking, by means of the additional control commands. The height of the load portion can also be adjusted to the detected height of the portable transmitting and receiving unit during other operations.

In an embodiment, a method is provided to control an industrial truck, in particular a picking vehicle. The industrial truck has at least three transmitting and receiving units, which are provided in a predetermined spatial arrangement with respect to one another on the drive portion. The at least three transmitting and receiving units are configured to measure a propagation time with a portable transmitting and receiving unit. The method according to the invention makes provision for determining a relative position of the portable transmitting and receiving unit with respect to the industrial truck by means of measuring a propagation time of the integrated transmitting and receiving units. In addition, the method provides controlling the industrial truck if the relative position with respect to the industrial truck is located within a predetermined spatial region. In this case, a content-related assignment of the nature of the control of the industrial truck and of the predetermined spatial region exists, in which the portable transmitting and receiving unit has been determined. In the method according to the invention, a control command is preferably sent as long as the portable transmitting and receiving unit is located in a predetermined spatial region. This means that no attempt is made to keep an operator on one side of a preferred boundary, but the transmitting and receiving unit triggers a control command in a spatial region.

In an embodiment of the method, the industrial truck is controlled in two or more predetermined spatial regions. Two or more control commands for the industrial truck can therefore be sent by two or more spatial regions.

In another embodiment of the method, the industrial truck is stopped and/or braked if the relative position of the portable transmitting and receiving unit is located in a first spatial region which comprises a load portion of the industrial truck. If the portable transmitting and receiving unit is located in a spatial region around the load portion, this prevents the industrial truck from driving or steering, wherein any steering or driving movement is stopped and/or braked. In an embodiment, the industrial truck is stopped and/or braked in a relative position to the portable transmitting and receiving unit, which can be selected. The relative position, which can be selected, makes it possible to select one of multiple positions relative to the portable transmitting and receiving unit. For example, this can be a start or an end of the load portion.

In another embodiment, the relative position, which can be selected, can be selected on the portable transmitting and receiving unit. If the portable transmitting and receiving unit is carried by a user of the industrial truck, said user can move the vehicle into a desired position relative to himself.

In an embodiment of the method, the industrial truck is controlled to drive to drive in a straight line if the relative position is located in a second predetermined spatial region, which is provided on both sides based on the longitudinal direction of the vehicle. The second spatial predetermined region further comprises the drive portion. If the speed for the industrial truck, when controlled from the second spatial region, is approximately walking speed, a person carrying the portable transmitting and receiving unit can walk along beside the vehicle, wherein said vehicle then stops if the person stops and the portable sensor therefore leaves the second spatial region. Approaching a predetermined relative position, for example at the end of the load portion, can be effected by a control command from a spatial region adjacent to the second spatial region.

In an embodiment, the industrial truck is stopped and/or braked if the relative position is located in a third predetermined spatial region which is located on a side of the drive portion pointing away from the load portion. The first, second and third spatial regions preferably enclose the industrial truck completely.

In a further embodiment of the method, a height above the ground is determined for the mobile transmitting and receiving unit and the industrial truck is controlled depending on the height. The height-dependent control can also be used for safety reasons, for example if the height of the portable transmitting and receiving unit is located below a predetermined minimum height. In this case, the transmitting and receiving unit could have been dropped and be lying on the ground, or the person carrying said transmitting and receiving unit has fallen. Furthermore, it is possible to lift and lower the load portion depending on a height of the portable transmitting and receiving unit, considerably simplifying loading and unloading for a user.

BRIEF DESCRIPTION OF THE DRAWINGS

A preferred example of the invention will be explained in greater detail below, wherein.

DETAILED DESCRIPTION OF THE INVENTION

Figure 1:
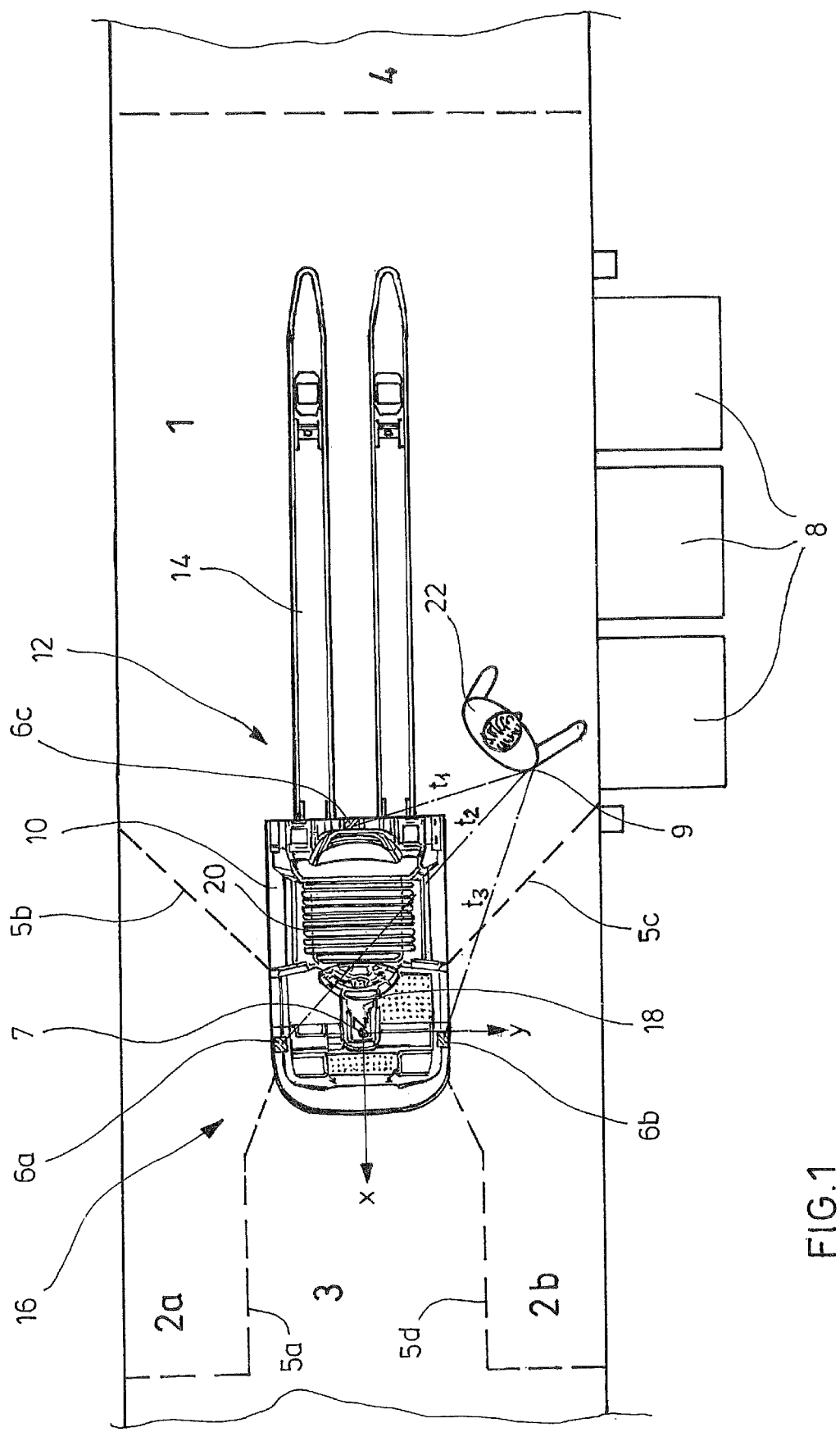
FIG. 1 illustrates a top plan view of an embodiment of a picking vehicle with a person with a portable transmitting and receiving unit in a position relative to the picking vehicle.

FIG. 1 shows an industrial truck or vehicle 10 in a view from above. The industrial truck 10 has a load portion 12 with two load forks 14. The load forks 14 are of sufficient length to receive multiple pallets which are configured for picking goods. A drive portion 16 of the industrial truck is configured with a short drawbar 18 and a driver position or standing platform 20. Standing at the driver position 20, a vehicle operator or driver 22 can operate the vehicle by means of the short drawbar 18.

The drive portion 16 is equipped with three transmitting and receiving units 6a, 6b, 6c. Based on the integrated coordinate system 7, the transmitting and receiving units 6a, 6b are located at the same X and Z position, at a positive and negative Y value, while the transmitting and receiving unit 6c is located at a Y value of zero. As a matter of principle, the three transmitting and receiving units 6a, 6b, 6c can generally be positioned anywhere on the industrial truck. In order to evaluate the propagation times, the coordinates of each of the transmitting and receiving units 6a, 6b, 6c simply have to be known in the integrated coordinate system 7.

The transmitting and receiving units 6a, 6b, 6c communicate with a portable transmitting and receiving unit 9 carried by the driver 22. The portable transmitting and receiving unit can be attached, for example, to his upper arm, but it can also be integrated in his clothes as a piece of clothing which can be worn, for example, as a glove, a head covering or in the form of a pendant around his neck.

The propagation times t1, t2, and t3 between the portable transmitting and receiving unit 9 and the integrated transmitting and receiving units 6a, 6b, 6c are determined. The position of the portable transmitting and receiving unit 9 can then be determined in the integrated coordinate system 7 from the three propagation times. When using three transmitting and receiving units, it is not always possible to also locate the portable transmitting and receiving unit 9 correctly with regard to the Z axis with three propagation times t1, t2, and t3. The position of the portable transmitting and receiving unit 9 is therefore preferably determined in the XY plane. A fourth integrated transmitting and receiving unit (not shown) is preferably used for an accurate resolution in the Z axis. Using the fourth propagation time t4, the position of the portable transmitting and receiving unit 9 can then also be precisely determined in the three-dimensional space.

The entire area in the XY plane around the industrial truck 10 is divided into four areas or spatial regions 1, 2a, 2b and 3. The areas are divided amongst themselves by boundaries 5a, 5b, 5c and 5d. Individual boundaries 5a to 5d can consist of a straight line. Other boundaries can have a complex course.

The spatial region 1 comprises the load portion 12 of the industrial truck 10. The load forks 14 are located completely within the spatial region 1. The driver standing platform is also still located in the spatial region 1 so that, if the driver 22 leaves the driver standing platform 20, he is located directly in the spatial region 1. The control command that the industrial truck brakes or stops is assigned to the spatial region 1. This means that if the vehicle is driving it is brought to a standstill. No driving operation is possible for the stationary vehicle if the portable transmitting and receiving unit 9 is located in the spatial region 1, unless the vehicle operator 22 is located on the driver position 20 and is controlling the vehicle 10 manually with the short drawbar 18.

The dividing line for the boundary to the spatial region 2 with its sectors 2a and 2b originates on the drive-side end of the standing platform 20. The boundaries 5b and 5c each extend as straight lines which form an acute angle to the longitudinal direction of the vehicle towards the load portion 12 of the industrial truck. A control command where the vehicle moves at a defined walking speed in the direction of the X axis is provided in areas 2a and 2b. The vehicle continues moving as long as the driver 22 is located in the spatial region 2b or 2a with the portable transmitting and receiving unit. The spatial region 2b borders the spatial region 1 in the direction of the load portion 12. The spatial region 2b also extends, in addition to the vehicle body, over the drive portion, for example by one or more vehicle lengths or lengths of the drive portion.

A third spatial region 3 is located on the side of the drive portion 16 facing away from the load portion 12. The third spatial region 3 is delimited by the drive portion of the vehicle and is delimited laterally by the two spatial regions 2a and 2b. Only the spatial region 3 is provided at the end of the lateral spatial regions 2a and 2b until said spatial region 3 ends, for example, due to the range of the sensors.

Figure 2:
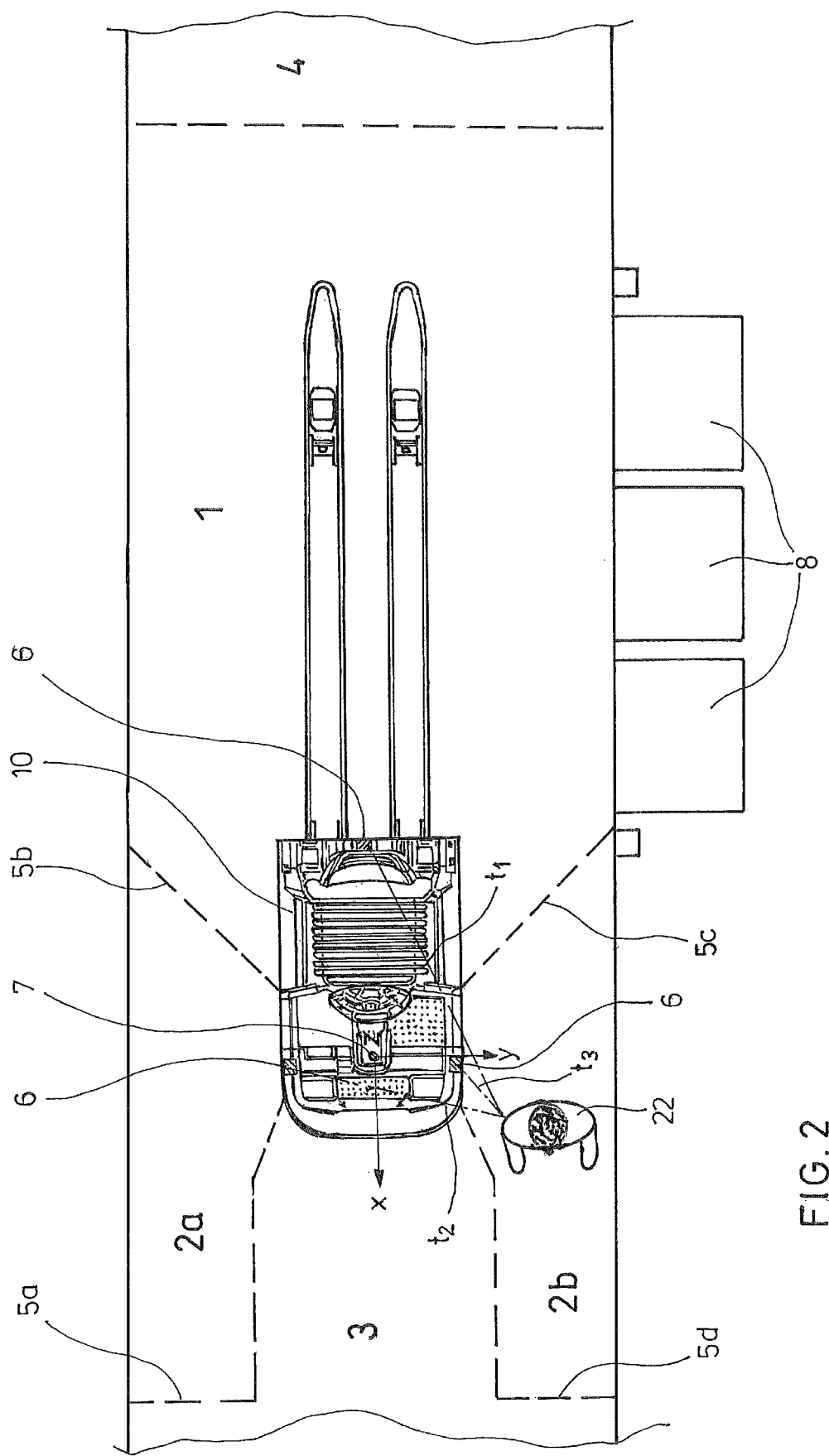
FIG. 2 illustrates a top plan view of an embodiment of the picking vehicle from FIG. 1, with a person with a portable transmitting and receiving unit in a position relative to the picking vehicle.

FIG. 2 shows the driver in the spatial region 2b, as a result of which the vehicle is moved at a predetermined speed in the direction of the X arrow. If the person stops, the vehicle continues driving until the driver exceeds the boundary 5c. The vehicle does not try to change its position here so that the driver returns to the spatial region 2b, but stops as the driver is now in the spatial region 1. The driver can then pick goods from the shelves 8 here.

If a fourth transmitting and receiving unit is installed in the industrial truck, the additional signal propagation time t4 can also be used to determine the Z coordinate. The possibilities of the vehicle control system can be expanded with the information about the Z coordinate. The vehicle can execute different commands depending on the height range, in which the portable transmitting and receiving unit 9 is located. Therefore if, for example, the person with the portable transmitting and receiving unit 9 falls and a minimum height in the Z coordinate is fallen short of, the vehicle can be braked, irrespective of the area in which the person is located at this point in time. It is also possible to provide lifting or lowering the load portion for certain heights, if the person is located in the spatial region 1.

LIST OF REFERENCE NUMERALS FOR FIGS. 1-2

1 Spatial region
2a Spatial region
2b Spatial region
3 Spatial region
5a Boundary
5b Boundary
5c Boundary 5d Boundary
6a Transmitting and receiving unit
6b Transmitting and receiving unit
6c Transmitting and receiving unit
7 Integrated coordinate system
8 Shelves
9 Portable transmitting and receiving unit
10 Industrial truck
12 Load portion
14 Load forks
16 Drive portion
18 Short drawbar
20 Driver position
22 Vehicle operator

The invention claimed is:

1. A system for controlling an industrial truck with a drive portion having a traction drive, a steering portion, and a load portion, the system comprising:
a portable transmitting and receiving unit configured to be positioned away from the industrial truck;
at least three transmitting and receiving units each disposed in a predetermined spatial arrangement with respect to one another on the drive portion of the industrial truck;
an evaluation unit disposed on the industrial truck and configured to determine a position of the portable transmitting and receiving unit relative to the industrial truck by measuring signal propagation times; and
a control unit disposed on the industrial truck and configured to transmit a control command for traction drive and/or steering if the position of the portable transmitting and receiving unit is located within a predetermined spatial region relative to the industrial truck.

2. The system according to claim 1, wherein the control unit has two or more predetermined spatial regions relative to the industrial truck that are each assigned control commands.

3. The system according to claim 2, wherein the two or more predetermined spatial regions are disposed symmetrically relative to a longitudinal direction of the industrial truck.

4. The system according to claim 1, wherein the control unit has a first predetermined spatial region comprising the load portion, wherein the first predetermined spatial region is assigned a control command for stopping and/or braking the industrial truck.

5. The system according to claim 4, further comprising selection of a position relative to the industrial truck wherein the braking and/or stopping occurs for the control command of the first predetermined spatial region.

6. The system according to claim 1, further comprising a second predetermined spatial region disposed on each side of the drive portion, wherein the second predetermined spatial region is assigned a control command for driving.

7. The system according to claim 6, wherein the control unit further comprises a third predetermined spatial region located on a side of the drive portion opposite the load portion, wherein the third predetermined spatial region is assigned a control command for stopping and/or braking.

8. The system according to claim 6, wherein the control unit further comprises a third predetermined spatial region located on a side of the drive portion opposite the load portion, wherein the third predetermined spatial region is assigned a control command for stopping and/or braking.

9. The system according to claim 1, wherein at least a fourth transmitting and receiving unit is positioned on the drive portion and the evaluation unit is configured to identify a height above ground level of the portable transmitting and receiving unit.

10. The system according to claim 9, wherein the control unit is further configured to send a control command for the load portion in response to an identified height of the portable transmitting and receiving unit.

11. The system according to claim 10, wherein the control unit is configured to send a control command to stop and/or brake the industrial truck if the identified height is below a minimum height.

12. The system according to claim 10, wherein the control unit is configured to send a control command for lifting or lowering the load portion if the identified height is within a predetermined height range and the position of the portable transmitting and receiving unit is located within a first predetermined spatial region.

13. A method for controlling an industrial truck comprising the steps of: configuring at least three integrated transmitting and receiving units in a predetermined spatial arrangement with respect to one another on a drive portion of the industrial truck; configuring the at least three integrated transmitting and receiving units to measure a propagation time with respect to a portable transmitting and receiving unit; determining a relative position of the portable transmitting and receiving unit with respect to the industrial truck by measuring the propagation time of the at least three integrated transmitting and receiving units; and controlling the traction drive and/or steering of the industrial truck in accordance with the location of the portable transmitting and receiving unit within a spatial region of the industrial truck.

14. The method according to claim 13, wherein the industrial truck is controlled in two or more spatial regions.

15. The method according to claim 13, wherein the industrial truck is stopped and/or braked if the relative position is located in a first predetermined spatial region, wherein the first predetermined spatial region comprises a load portion of the industrial truck.

16. The method according to claim 13, wherein the industrial truck is stopped and/or braked in the relative position to the portable transmitting and receiving unit.

17. The method according to claim 16, wherein the relative position can be selected on the portable transmitting and receiving unit.

18. The method according to claim 13, wherein the industrial truck is controlled to drive if the relative position is located in a second predetermined spatial region, and wherein the second predetermined spatial region is provided on both sides of the industrial truck relative to a longitudinal direction.

19. The method according to claim 13, wherein the industrial truck is stopped and/or braked if the relative position is located in a third predetermined spatial region, wherein the third predetermined spatial region is disposed on a side of the drive portion opposite a load portion.

20. The method according to claim 13, wherein a height above ground is determined for the portable transmitting and receiving unit and the industrial truck is controlled depending on the height above ground.

21. The method according to claim 20, wherein the industrial truck is stopped and/or braked if the height above ground is below a predetermined minimum height.

22. The method according to claim 20, wherein a load portion of the industrial truck is raised or lowered if the height above ground is in a predetermined height range and the relative position is located in a first predetermined spatial region.

23. A system for controlling an industrial truck including a drive portion including a traction drive, a steering portion and a load portion, the system comprising:
- a portable transmitting and receiving unit configured to be positioned away from the industrial truck and movable relative to a position within a fixed coordinate system occupied by the industrial truck;
- at least three transmitting and receiving units each disposed in a predetermined spatial arrangement with respect to one another on the drive portion of the industrial truck;
- an evaluation unit disposed on the industrial truck and configured to determine a position of the portable transmitting and receiving unit relative to the industrial truck; and
- a control unit disposed on the industrial truck and configured to transmit a control command for traction drive and/or steering when the position of the portable transmitting and receiving unit moves from a first predetermined spatial region to a second predetermined spatial region of the industrial truck.

24. The system according to claim 23, wherein the control unit has three or more predetermined spatial regions relative to the industrial truck that are each assigned control commands.

25. The system according to claim 23, wherein the first and second predetermined spatial regions are disposed symmetrically relative to a longitudinal axis of the industrial truck.

26. The system according to claim 23, wherein the control unit has a first predetermined spatial region comprising the load portion, wherein the first predetermined spatial region is assigned a control command for stopping and/or braking the industrial truck.

* * * * *